US012593180B1

(12) United States Patent
Slevin

(10) Patent No.: US 12,593,180 B1
(45) Date of Patent: Mar. 31, 2026

(54) PROGRAMMING NON-BLUETOOTH HEARING AID

(71) Applicant: Richard S. Slevin, Los Altos Hills, CA (US)

(72) Inventor: Richard S. Slevin, Los Altos Hills, CA (US)

( * ) Notice: Subject to any disclaimer, the term of this patent is extended or adjusted under 35 U.S.C. 154(b) by 229 days.

(21) Appl. No.: 18/382,004

(22) Filed: Oct. 19, 2023

Related U.S. Application Data

(60) Provisional application No. 63/380,336, filed on Oct. 20, 2022.

(51) Int. Cl.
*H04R 25/00* (2006.01)

(52) U.S. Cl.
CPC ............. *H04R 25/50* (2013.01); *H04R 25/55* (2013.01)

(58) Field of Classification Search
CPC ................................ H04R 25/50; H04R 25/55
See application file for complete search history.

(56) References Cited

U.S. PATENT DOCUMENTS

| | | | | |
|---|---|---|---|---|
| 11,153,695 B2 * | 10/2021 | Ma | ........................ | H04R 25/407 |
| 11,477,582 B1 * | 10/2022 | Ruparel | ............... | H04R 25/554 |
| 2021/0176587 A1 * | 6/2021 | Ueno | ..................... | G10H 3/186 |
| 2023/0199988 A1 * | 6/2023 | Wu | ......................... | G06F 1/266 361/679.01 |

* cited by examiner

*Primary Examiner* — Tuan D Nguyen
(74) *Attorney, Agent, or Firm* — Patent Law Offices Michael E. WOODS; Michael E. Woods

(57) ABSTRACT

A system and method for improving hearing enhancement solutions across a wide range of hearing devices, particularly for a wide-range of disparate user-provided hearing devices, including a dock having a transmissions conversion module for translating/converting Bluetooth communications from a transmitter/transceiver coupled to a configuration system to a non-Bluetooth personal audio device (e.g., a hearing aid) enabling a user to program the personal audio device with a user-developed personal customized hearing aid profile.

8 Claims, 3 Drawing Sheets

PROGRAMMING NON-BLUETOOTH HEARING AID

CROSS REFERENCE TO RELATED APPLICATIONS

This application claims the benefit of U.S. Provisional Application 63/380,336 filed on Oct. 20, 2022, the contents of which are hereby expressly incorporated by reference thereto in its entirety for all purposes.

FIELD OF THE INVENTION

The present invention relates generally to audio systems and methods, and more specifically to a hearing enhancement system generically applicable to a user-worn hearing device having one or more earphones, such as a headset or headphone, wired or wireless, preferably with two or more speakers or audio transducers for stereo, and may include an external adaptor box for use with an external hearing apparatus, for example a headset or headphone; also relating generally to hearing aid systems and methods, and more specifically, but not exclusively, to programming non-Bluetooth hearing aid systems.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The growth of consumer electronics has included many different portable computing systems that process audio data for a user. A user interface to such a system often includes a personal audio option which privatizes audiblized data so that only the user may hear. Such options include user-wearable devices that include one or two earphones. Often it is preferred that the audiblized data is presented by the device in stereo (e.g., an earphone for each ear). The earphones may be included in an industrial design for headphones, headsets, ear buds, and the like (collectively hearing devices).

Each user has a hearing profile characterizing how the user will actually perceive and process incoming audible information and a desired profile how the user would like to perceive and process incoming audible information.

Hearing impairment of users sometimes result in use of hearing prosthetics (aids, amplifiers, compressors) to amplify and/or tune ambient or telephonic communications frequencies to partially or wholly compensate for such impairment. A trained audiologist is often recommended to set and manage these prosthetics. It can be inconvenient for users of such prosthetics to use non-prosthetic devices in cooperation with their prosthetic. It can also be inconvenient for such users to avoid using non-prosthetics for any activity. For non-audiologist units, there have been presets for mild, more severe, and severe hearing loss and do not tailor the adjustments to the users' hearing, with possible selection of "loss severity" identification.

Often these industrial designs are configured with lightweight and small form factor implementations as a goal. Increasingly there is a desire for advanced functionality in these hearing devices which can be a conflict for the industrial design goals.

There may be several potential conflicts—the more functionality that is included, the hearing device may become less desirable because of cost, size, and or complexity. To minimize costs, it can be difficult to allow for upgradeability so users may need to consider replacing/upgrading their hearing devices more frequently.

As the desirability of these user-enhancements increases, disadvantages of custom interface controls for configuration and operation of enhanced features for different hearing devices may discourage acceptance.

Applicant has disclosed systems and methods for a user performing a set of specialized at-home hearing tests and reconfiguring the user's hearing aids using results of these tests when the hearing aid is a Bluetooth device. In an event when the user has non-Bluetooth hearing aids or other personal audio system that is non-Bluetooth, the existing programming/updating solutions are unavailable.

It may be advantageous to provide a solution to the users of non-Bluetooth hearing aid and audio solutions that beneficially configured with a customized user audio profile developed for the individual user.

A solution to some of these conflicts may improve user acceptance and expand a market for desirable solutions.

BRIEF SUMMARY OF THE INVENTION

Disclosed is a system and method for improving user acceptance and expanding a market for desirable solutions including a system and method for providing a user-accessible programming solution to the users of non-Bluetooth hearing aid and audio solutions that beneficially configured with a customized user audio profile developed for the individual user. The following summary of the invention is provided to facilitate an understanding of some of the technical features related to a hearing enhancement system generically applicable to a user-worn hearing device having one or more earphones, such as a headset or headphone, wired or wireless, preferably with two or more speakers or audio transducers for stereo, and is not intended to be a full description of the present invention. A full appreciation of the various aspects of the invention can be gained by taking the entire specification, claims, drawings, and abstract as a whole.

An embodiment of the present invention may include a standalone interface system for cooperative use with multiple different hearing devices, and in some cases with a computing system. The interface system may include a small housing having a set of "IN" and "OUT" connections conforming to multiple industry standards used by the multiple different hearing devices. For example, these standards may include registered jacks (e.g., RJ11), headphone jacks (e.g., 2.5 mm or 3.5 mm), and USB and the like). Additionally, the housing may include a power plug with an optional rechargeable battery. The housing may also include a Bluetooth module as well as a USB pass through. The Bluetooth module may be paired for use with a hearing device interface application executing on a user-operated computing system (e.g., a mobile computing platform, smartphone, PDA, tablet, laptop, and the like). The application may be used to access, define, and set various user-definable features of the interface system. For example, the interface device may provide for independently controlling left and right equalization (EQ) of any wired or wireless headset. Wired solutions may include signal pass throughs, like a USB headset plugged into the box and then the box is plugged into a laptop or other computer to make PC calls. Same method for RJ headsets plugged into a phone and headsets plugged into any headset device. Bluetooth Wireless headsets/buds, that are true wireless, meaning the left and right channels can be separated, can also work with this system.

An embodiment includes a charger dock (e.g., a storage/charging box and the like) having a Bluetooth module in communication with the hearing aid charger dock that then can communicate with a user application to develop and/or download a customized user audio profile. The non-BT devices include a communication port, sometimes a physical port, allowing the non-Bluetooth devices to be programmed through signals exchanged through the communication port. The Bluetooth module communicates with both the Bluetooth signals from the application and with the non-Bluetooth communication port to program the non-Bluetooth hearing aids within the charger dock using a UART (example, a universal asynchronous receiver-transceiver) connection that is already in the charger box and on the hearing aids.

The application may allow the user to set each ear, left and right separately with each frequency, thereby allowing for hearing aid or PSAD/PSAP type customized control of sound to each car independently.

The application may sequence tones in each frequency and the user could adjust the volume until the sound is just perceptible by the user, then move to the next frequency. Once all the frequencies are adjusted on both cars, the interface system may record the setting on the box and that box becomes the enhanced hearing solution and can be used with any headset plugged into it or connected by BT. The BT is a bit different in that the app on the phone would not need the box, but the app would act as a pass through to the wireless headsets/buds.

Embodiments of the present invention may be used for TV listening as well and for audience situations.

The user is enabled to use any hearing device and allow an embodiment of the present invention to control and apply the desired user profile to all the hearing devices. The user need learn but one set of interface controls for any hearing device, including new hearing devices.

An embodiment includes a standalone interface system for cooperative use with multiple different hearing devices, and in some cases with a computing system and self-served audiologist application setting custom equalizer values for multiple bands in one or more environments, including a dock having a conversion module receiving wireless Bluetooth configuration information from a transmitter and programming a particular personal audio device using a different non-Bluetooth communications protocol.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
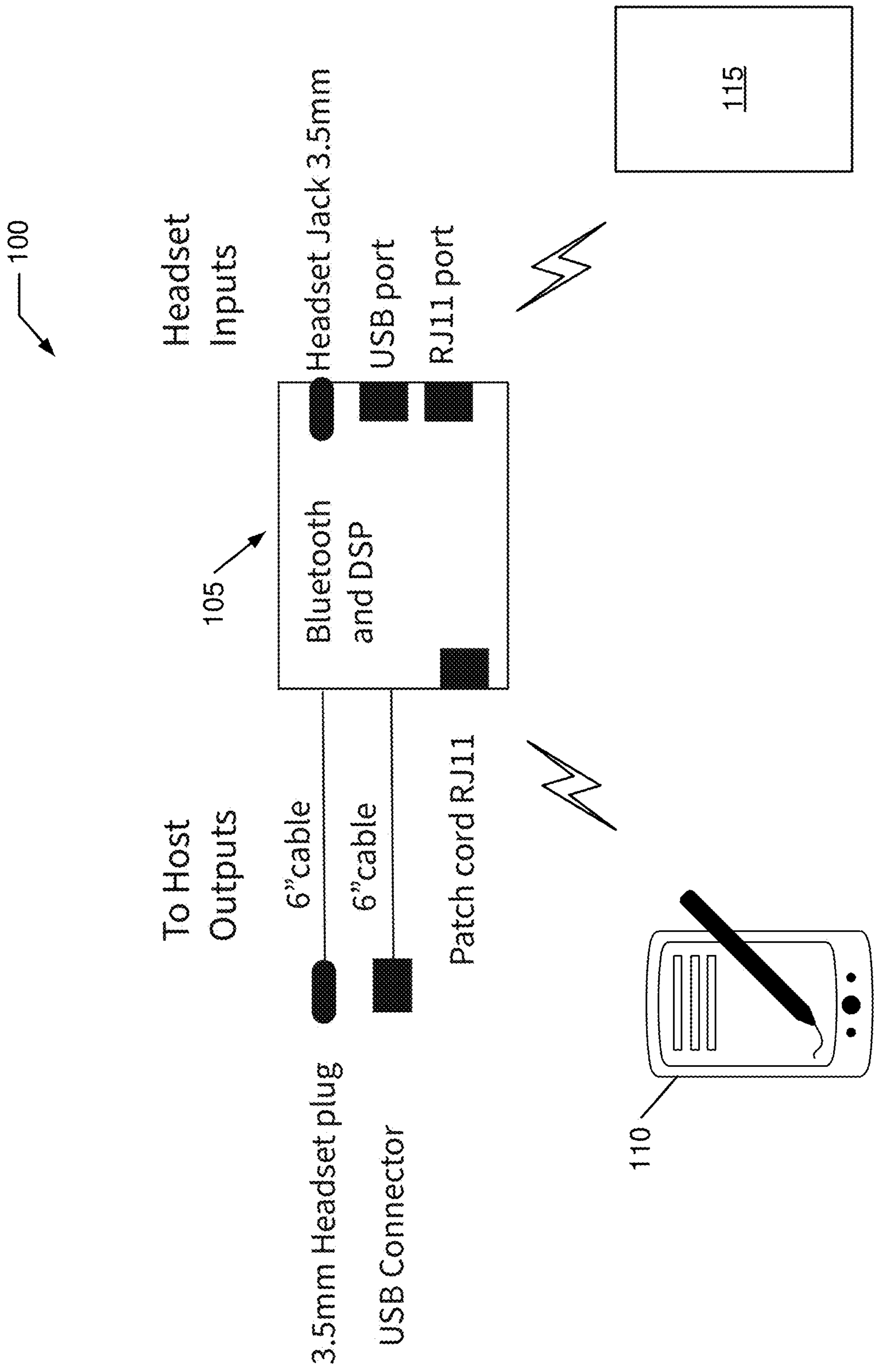
FIG. 1 illustrates an enhanced hearing device.

Embodiments of the present invention provide a system and method for improving hearing enhancement solutions across a wide range of hearing devices, particularly for a wide-range of disparate user-provided hearing devices. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

FIG. 1 illustrates an enhanced hearing device 100 including an electronics unit 105 and a computing system 110 in communication with unit 105 (wired or wireless communication) and a hearing device 115. Device 100 defines a standalone interface system 105 for cooperative use with multiple different hearing devices 115, and in some cases with a computing system 110. The interface system 105 may include a small housing having a set of "IN" and "OUT" connections conforming to multiple industry standards used by the multiple different hearing devices. For example, these standards may include registered jacks (e.g., RJ11), headphone jacks (e.g., 2.5 mm or 3.5 mm), and USB and the like). Additionally, the housing may include a power plug with an optional rechargeable battery. The housing may also include one or more of a Bluetooth, DSP, and other modules as well as a USB pass through. The Bluetooth module may be paired for use with a hearing device interface application supported by or executing on user-operated computing system 110 (e.g., a mobile computing platform, smartphone, PDA, tablet, laptop, and the like). System 110 may be used to access, define, and set various user-definable features of interface system 105. For example, the interface device 105 may provide for independently controlling left and right equalization (EQ) of any wired or wireless headset 115. Wired solutions may include signal pass throughs, like a USB headset plugged into the box and then the box is plugged into a laptop or other computer to make PC calls. Same method for RJ headsets plugged into a phone and headsets plugged into any headset device. Bluetooth Wireless headsets/buds, that are true wireless, meaning the left and right channels can be separated, can also work with this system.

The system 110 may allow the user to set each car, left and right separately with each frequency, thereby allowing for hearing aid or PSAD/PSAP type customized control of sound to each car independently.

The system 110 may sequence tones in each frequency and the user could adjust the volume until the sound is just perceptible by the user, then move to the next frequency. Once all the frequencies are adjusted on both cars, the interface system 105 may record the setting internally (or accessible through a cloud storage for robustness and user-accessibility across multiple units 105 with system 100 becoming the enhanced hearing solution and can be used with any headset plugged into it or connected by BT. The BT is a bit different in that the application on the system 110 may not need unit 105, but the application may act as a pass through to the wireless headsets/buds of device 115.

Embodiments of the present invention may be used for TV listening as well and for audience situations.

The user is enabled to use any hearing device and allow an embodiment of the present invention to control and apply the desired user profile to all the hearing devices. The user need learn but one set of interface controls for any hearing device, including new hearing devices.

Using computing system 110 to set/control system 100 may include one or more of following steps:

1. Plug in a stereo or mono headset 115 into unit 105 (side marked inputs) and the box gets plugged into the host source (output side), like a PC, TV, amplifier, or other electronic audio source device.
2. There is a charge port on unit 105, or unit 105 may be powered from a wall adapter.
3. Setup is via a phone application supported by computing system 110 communicated (preferably wirelessly) to unit via Bluetooth (BT). This needs to be paired.
4. Once paired the application is launched and the setup process begins.
5. The user wears/dons a particular headset 110 to be used.
6. The application may have many implementations, for example one implementation may be set for multiple EQ levels, for instance, 250 Hz, 500 Hz, 1 KHz, 2K Hz, up to 18 KHz, or greater.
7. A configuration process is performed by system 110 in cooperation with unit 105 first starts with the left ear and sends a continuous tone or other audible test pattern to headset 115 at the lowest Hz setting. The user then reduces the volume, for example with a slider, until the sound is at the lowest level of audibility. Then presses to proceed button. Each tone/pattern is then sent, and the user adjusts a volume for each tone/pattern in sequence until all left ear tones/patterns have been set. Alternatively, system 110 may issue a series of tones, each at decreasing amplitude—the user responding "yes" as long as the tone is recognized. Then a "no" or a no-response may be set at the audible threshold (system 110 may add back an increment)—many different implementations of the user setting the audio levels when desired/needed and not having reliance on an audiologist.

8. Once the left ear is completed, the configuration process changes to the right ear and proceeds as described in step 7 above.

9. At the end of the configuration process, system 100 records the user-selected levels (e.g., on the box or in the cloud) and unit 1015 is ready for use.

10. The system 110/application may show the user's hearing loss and preferably automatically boosts volumes in each frequency band to attempt to level the sounds to "normal" hearing.

11. For hearing losses in excess of 20 db, supplementation of such frequencies may be done gradually due to the brain's ability to adjust to the new sounds. This is a time issue and may take weeks or months to bring back normal hearing such as when the loss is severe. An algorithm may determines and sets initial values, with adjustments as the user gets used to adjusted values. Adjustments may be time-based and user-acceptance. Alternatively, the user may provide system 110 with a directive to advance to the next level.

12. Note also that system 100/unit 105 may be used as an intermediate audio interface to a BT headset (not wired to the box) for sources coming from any device you plug into unit 105, or the system 110/application described herein may be used as the hearing aid app for sources coming from a phone.

Frequency can go to 18 KHz when audio signals include music. System 110 adjusts for music as well as a profile the user can set and use. User can set volume with a slider or system 110 can send beeps to the user and they respond with yes for each setting until they cannot hear it, then no, we then add back one increment for the setting. The setting process has many implementations and may be generic using tones and user acceptance. A key is the user sets the levels, not the audiologist or using a standard generic curve.

For users with moderate hearing loss (>20 db), system 110 may include an algorithm that sets the initial user settings and adjusts it as the user gets used to the new input. The system can do that based on time and user acceptance, or the user can say when they are comfortable moving to the next level.

System 110 can adjust the users profile in the box, or can do it directly to the earset/headset. BT is one RF option. Embodiments may include other wireless and wired connections, with BT or other applicable RF. The adjustment can happen from the box by wired or wireless method.

Figure 2:
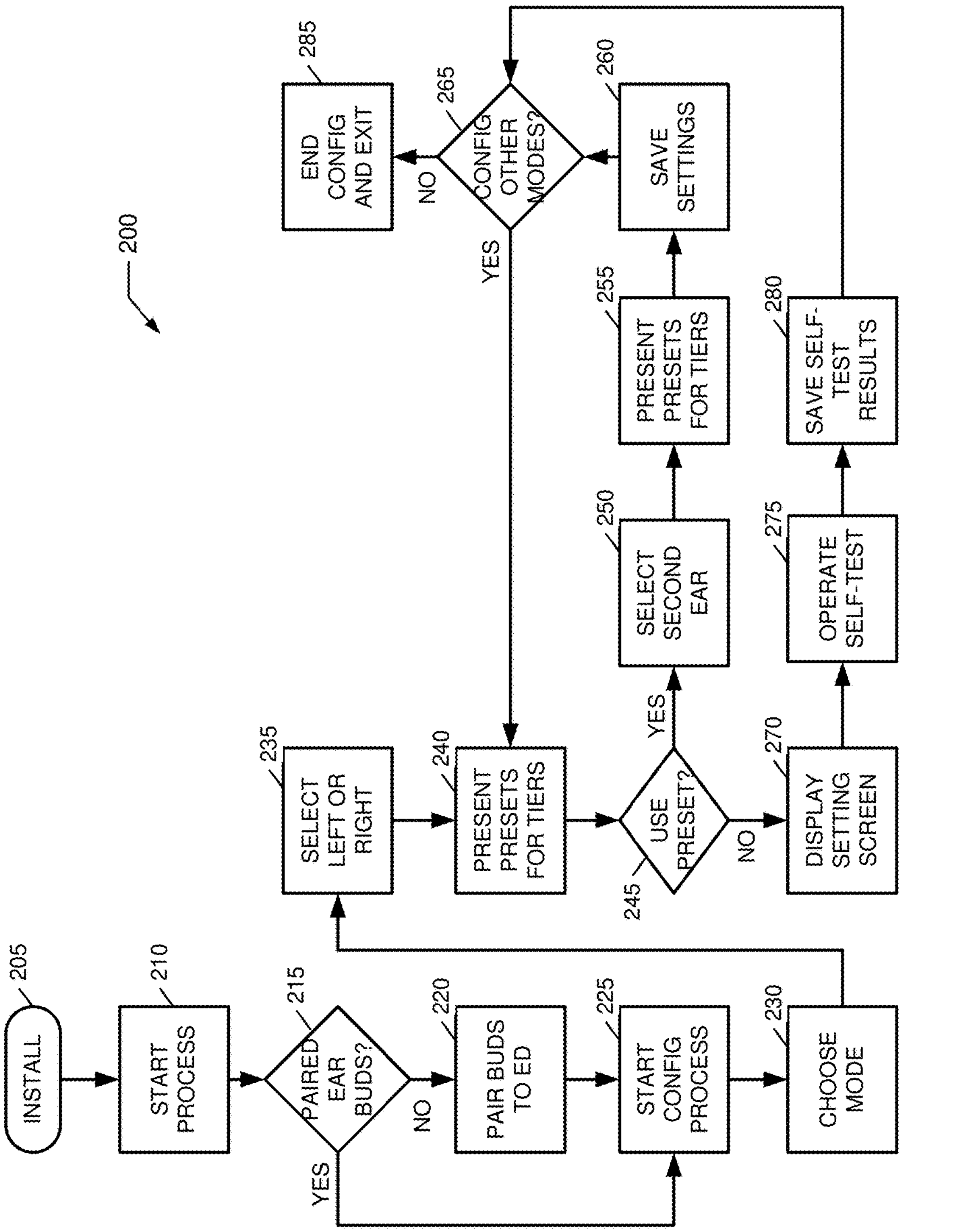
FIG. 2 illustrates a process flow for an enhanced hearing device.

FIG. 2 illustrates a process flow 200 for an enhanced hearing device, such as system 100 illustrated in FIG. 1. Process flow may be implemented in many different ways, such as for example as an "audiologist" application supported by an operating system of a portable electronic device including cellphones, digital players, tablets, laptops, and the like having a processor and stored program instructions for producing audio signals for audiblization by a hearing device. To simplify the presentation, an implementation including an application supported by an operating system of a cellphone that generates audible signals through a wireless hearing device coupled to the cellphone.

Upon starting the application, a splash screen may be presented that identifies the application and a provider/brand associated with the application. Many variations for the splash screen such as a login to a remote server and/or detection/verification of active/available hearing devices. An onboarding phase confirms application setup/configuration, allows for setup the first time opened and is process starting point for the first time the application is opened—it may automatically advance to a hearing test upon first launch of application.

A home screen may allow for viewing a status of hearing devices and current mode. For example, show if/when earbuds are detected, show battery status of each wireless bud, indicate whether noise cancellation is active as well as showing the current mode of the application and active user profile; and allows for review of a user profile, selection of a user profile, and/or initiation of a new hearing test or user profile change.

A screen for hearing rang allows an operator to view current user (hearing) profile and initiate a hearing test. The user/operator may see current hearing curve(s), modify adjustment values of a hearing curve, and/or start a hearing test, with options to save any changes.

A hearing test allows a user to test/set a hearing profile allowing adjustment of hearing to individual hearing conditions and environments. This example includes a step-by-step test on each speaker/earpiece to determine and accumulate the user profile for hearing adjustment.

Example of this testing process—"Find a quiet place and wear/place/insert hearing device(s) and ensure that they are on and active. A beep will sound—hear anything?"=a control is provided to start the test.

When a stereo device is active, the application tests one ear and then the other—for example start with the left ear—a tone is played for the selected ear and the user is queried as to whether the beep is heard. The user has 3 options—yes, no, and next band. Yes—lower volume, No—set volume to current increment+1, next band accepts current level. The interface screen shows the frequencies and a minimalist ball that lets the user know the current audio amplitude testing level. The process cycles through all the bands in each ear, setting the audio profile for each ear and each band until all is done.

The system includes a progress bar informing the user of the estimated time to complete the test as well as double-checking whether the user selected the correct threshold/ audio level to limit mistakes and improve the quality of the completed profile.

Once completed, the user is able to enjoy their hearing device (e.g., the ear buds) with high fidelity, adjusted and levels customized and tuned to the specific needs of the user, by the user. The process returns to the hearing profile menu.

The hearing profile screen allows the user to use and manage one or more customized profiles. The user is enabled to change an equalization depending upon the activity/environment that where the user is present (music, outdoor, speech, dining, vehicle, and the like). The user may select a stored profile, modify the selected profile, reset the selected profile, among other activities.

When changing/adjusting a stored profile, a user may see interface elements overlayed on an audio curve. The user may touch and slide the dots for each band to change the values of the adjustment profile. While changing the equalizer function, a sound sample will be heard to allow the user to evaluate the change. A user selects a dot for a particular band, adjusts the dot up or down to set the adjustment for that band. When the user returns to a higher level menu, the system queries the user whether to save the adjusted values.

Process 200 is an implementation of that application flow, including steps 205-285. After an install step 205, step 210 starts the user experience. Process 200 tests at step 215 whether hearing device(s) (e.g., ear buds) are paired to the electronic device (ED). When the test at step 215 is negative, process 200 performs steps 220 (pair the hearing devices to the ED) and step 225 (start configuration). When the test at step 215 is affirmative, process 200 advances directly to step 225.

After starting the configuration (step 225), process 200 performs step 230 to choose a mode, then step 235 to select left or right hearing device, then present preset values for each band step 240, and then test, at step 245, whether the user wishes to use presets.

When the test at step 250 is affirmative, process 200 performs steps 250-265. When the test at step 250 is negative, process 200 performs steps 270-280 and then advances to step 265.

Step 250 switches to the second car, step 255 presents presets for the bands, step 260 saves the settings as the user profile, and step 265 is a test whether the user wishes to configure other/additional modes. Step 270 displays the settings screen (for example manual settings), step 275 operates the user self-test features to test and set desired thresholds for the bands in the hearing curve range, with step 280 saving the self-test results. Process 200 performs the test at step 265 after step 280.

When the user would like to configure other modes, or make adjustments, the test at step 265 is affirmative and returns to step 240 as described herein. When the test at step 280 is negative, process 200 performs step 285 which ends the configuration and exits.

The applicability of the disclosed systems and methods are limited to pure mobile system. For stationary listening solutions, for example a person or persons watching television and listening to audio through a listening bar, the solutions described herein can be used in cooperation with the listening bar/television watching. The listening bar could have user selected profiles, different profiles for different users, stored and available for watching and listening to favorite shows. The listening device may incorporate system 110/process 200 or the listening bar may respond to user profile information stored on the user's electronic device or external box associated with the user's electronic device.

System 110 and/or process 200 may change the output of the bar for the hearing impaired person. It would enhance the mid range so normal hearing would be affected, but in our testing, it just makes voice clearer for moderately adjusted midrange. So basically, the device would have several EQ settings that can be toggled.

In other applications, such as multiple people concurrently watching a television show, for example both with headphones or one with headphones and the other listening to ambient audio, both users may have different profiles that could be concurrently used to provide both with enhanced audio signals from the same audio stream associated with a single television show (for example). Having a feature where the headset can be used and the bar at the same time is certainly possible to do simultaneously. The system and process may simply embed the electronics prior to the headset plug in. The device could then have the hearing-impaired EQ on either the bar or the headset and could be toggled.

Other features and variations may include: use of two splash screens, one for Company A using their logo, one for Company B using its marketing—for example a company used to market the outdoor hearing products; connect to the RF/BT for each ear; Setup screens—3 preset profiles plus 3 custom hearing profiles that are user settable; Presets—3 preset profiles for mild, moderate and severe hearing loss based on standard age related hearing loss, these are presets, but the user can chose to use those or set it themselves; 3 custom user settable—Outdoor, speech and music. Outdoor and Music have full band range from 40 Hz to 18 KHz (500 Hz, 2 KHz, 5 KHz, 8 KHz, 12 KHZ, 14 KHz, 18 KHz); Speech is 40 Hz to 5 KHz (labels are 500 Hz, 1 Khz, 2 KHz, 2.5 KHz, 3.5 KHz, 4 KHz, 5 KHz); there are 7 bands total, attenuation in each band should show 25 db with the app able to set each frequency band for each ear separately. To do the setting-a tone is sent to each ear (one at time) the user then adjusts the sound EQ volume until it is barely perceptible. A step down and they cannot hear it at all. Then press the "set" and move to the next EQ band. This process repeats for all frequency bands until complete, then moves to the other ear and repeat the same process. This is the base line audiologist setting for this person. Controls need to adjust volume and EQ setting for each ear. Volume must also be controlled on the each ear. This is done by either ear app or the earset.

May include a select screen for all the profiles and ability to edit; may include a screen to show the users hearing loss graphically by dB on a smooth line. The user should be able to grab the curve with the touch screen and move it to augment/optimize hearing. Save or just use for this session.

The user can switch profiles they set, outdoor, indoor and music. These can be switched either on the app or on the earset.

Provides an ANC on/off setting. This should be remembered in the user preference settings, but can be overridden by the user on the earset.

Notes: system and method are simple and easy to use; Added instructions on the application improve an case of use; Provides an optional LED on the earsets for setup, charging indication, and the like. The LED will be able to be shut off after setup and after beginning use; and provides a method to answer the phone and hang up; and the flash memory on the earsets may be enabled to hold the user settings; Once set, the smartphone will not be needed to use the earsets.

Figure 3:
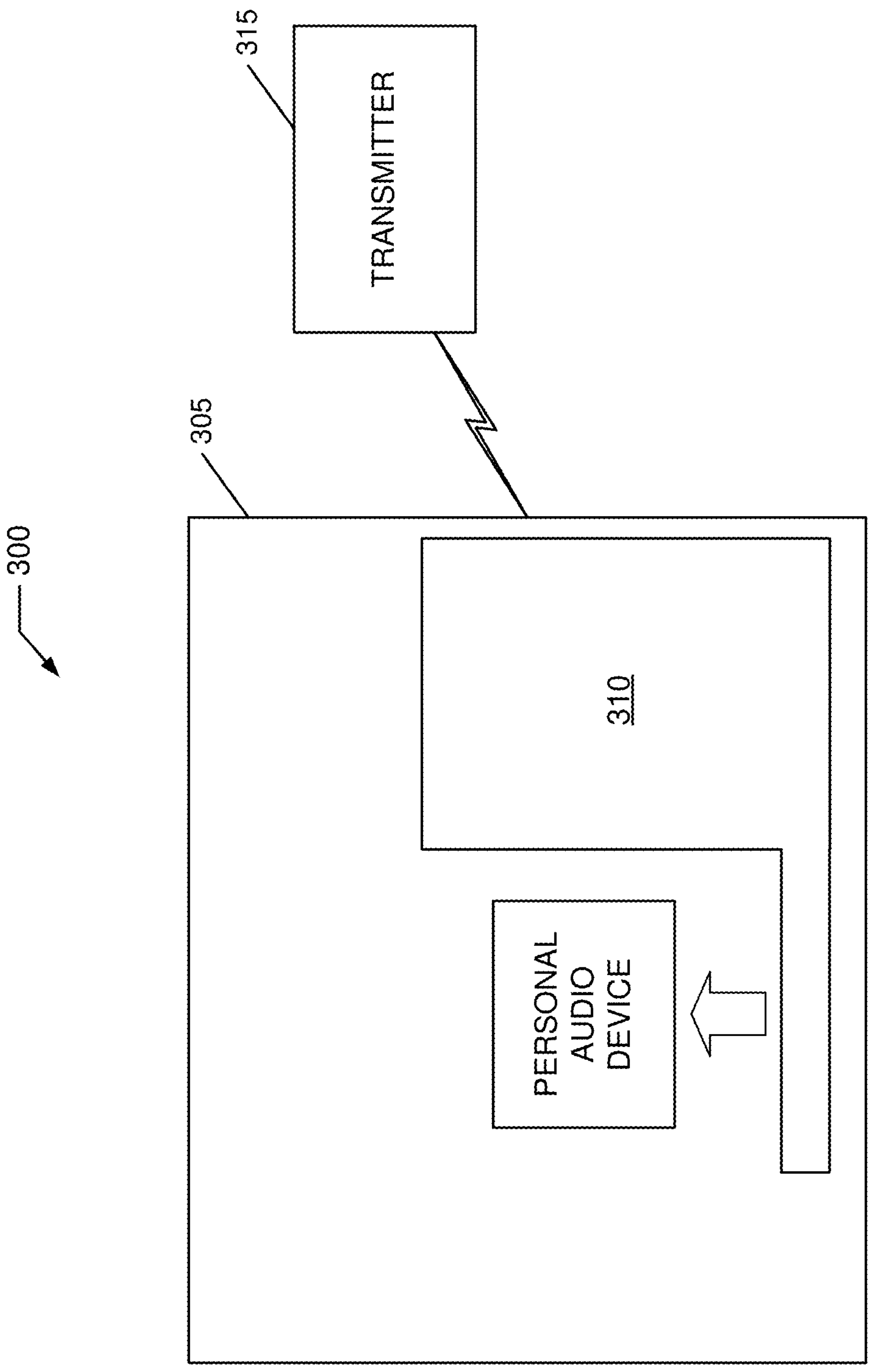
FIG. 3 illustrates a non-Bluetooth hearing aid user programming system.

FIG. 3 illustrates a non-Bluetooth hearing aid user programming system 300. System 300 includes a charger dock 305 for a non-Bluetooth personal audio device (e.g., a non-Bluetooth hearing aid, headset, monitor, or the like). Dock 305 includes a communications module 310 that includes a pair of communications subsystems: one for programming the personal audio device (wired or wirelessly) in a non-Bluetooth protocol and another for communicating (wired or wirelessly) with a transmitter 315 disposed outside dock 305.

In an embodiment, transmitter 315 includes a Bluetooth transmitter wirelessly communicating with communications module 310. Communications module 310 translates/converts the Bluetooth communications from transmitter 315 into non-Bluetooth communications with the personal audio device. Transmitter 315 may be part of computing system 110 illustrated in FIG. 1 and the Bluetooth communications from transmitter 315 may include the customized hearing aid profile developed by the user as well as code for writing this profile to the personal audio device with the non-Bluetooth communications exchanged between module 310 and the personal audio device.

This module is included within charger dock 305 which often includes electrical contacts (when a wired configuration) for charging and exchanging non-Bluetooth signals. Repurposing these electrical contacts using converted Bluetooth communications from transmitter 315 to signals appropriate for the personal audio device allows system 300 to program non-Bluetooth personal audio devices. In some embodiments, system 300 may also program Bluetooth personal audio devices directly, enabling any end-user programable personal audio device to be programmed simply and efficiently.

In some embodiments, module 310 may include a transceiver receiving status or configuration information from the non-Bluetooth personal audio device and transmitting it wirelessly using Bluetooth to transmitter device 315 including a receiver.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A standalone interface system for cooperative use with multiple different hearing devices, comprising a computing system and self-served audiologist application setting custom equalizer values for multiple bands in one or more environments, a dock having a conversion module receiving wireless Bluetooth configuration information from a transmitter and programming a particular personal audio device using a different non-Bluetooth communications protocol; and a stored program computing system having a processor executing stored program instructions obtained from a memory, execution of the stored program instructions sequence tones in each frequency of a set of frequencies and allow to optionally adjust the volume of each frequency until the sound is just perceptible by a user, then move to the next frequency of the set, and wherein once all the frequencies are adjusted on both ears, the standalone interface system records the settings on an enhancement device and that enhancement device becomes an enhanced hearing solution and used with a particular hearing aid.

2. The interface system of claim 1 wherein the system includes a housing having a set of "IN" and "OUT" connections conforming to multiple industry standards used by the multiple different hearing devices, including registered jacks, headphone jacks, and USB.

3. The system of claim 1 wherein an RF implementation includes the processor performing a pass through function for said hearing device, the hearing device including wireless hearing devices such as wireless headsets/buds.

4. The system of claim 1 wherein said enhancement device includes an external structure separate and distinct from the hearing device.

5. The system of claim 4 further comprising a user profile including a set of user-determined frequency adjustments for an audio signal wherein said user profile is included in said external structure.

6. The system of claim 1 wherein said enhancement device includes an internal structure integrated with the hearing device.

7. The system of claim 6 further comprising a user profile including a set of user-determined frequency adjustments for an audio signal wherein said user profile is included in said internal structure.

8. The system of claim 1 further comprising a user profile including a set of user-determined frequency adjustments for an audio signal.

* * * * *